United States Patent [19]

Etoh et al.

[11] 4,190,889
[45] Feb. 26, 1980

[54] AUTOMATIC CENTERING CONTROLLER FOR A MACHINE TOOL

[75] Inventors: Kunihiko Etoh, Toyota; Kaoru Owa, Nukata; Kunimichi Nakashima, Anjoh, all of Japan

[73] Assignee: Toyoda-Koki Kabushiki-Kaisha, Aichi, Japan

[21] Appl. No.: 936,780

[22] Filed: Aug. 25, 1978

[30] Foreign Application Priority Data

Aug. 26, 1977 [JP] Japan .............................. 52-103033

[51] Int. Cl.² ............................................. G06F 15/46
[52] U.S. Cl. ..................................... 364/474; 364/107
[58] Field of Search ............... 364/468, 474, 475, 476, 364/104, 107

[56] References Cited

U.S. PATENT DOCUMENTS

| | | | |
|---|---|---|---|
| 3,598,978 | 8/1971 | Rempert | 364/107 |
| 3,633,011 | 1/1972 | Bederman et al. | 364/107 |
| 3,670,153 | 6/1972 | Rempert et al. | 364/107 |
| 4,118,871 | 10/1978 | Kirkham | 364/474 |

Primary Examiner—Felix D. Gruber
Attorney, Agent, or Firm—Oblon, Fisher, Spivak, McClelland & Maier

[57] ABSTRACT

An automatic centering controller for centering the axis of a tool spindle of a numerically controlled machine tool on the axis of a reference circumferential surface of an article mounted on the machine tool. The controller comprises a touch sensing device mounted in the tool spindle for detecting the touch of a probe thereof with the reference circumferential surface, a pulse generator for applying feed pulses to servomotors through a numerical controller so as to move the tool spindle along X and Y-axes, and a pulse control device connected to the touch sensing device, the numerical controller and the pulse generator. In response to a centering instruction and the touch signal, the pulse control device applies axis designation signals to the numerical controller being under a manual mode and controls the feed pulses applied to the numerical controller so that the tool spindle is first moved along the X-axis so as to position the axis of the tool spindle at the median between two points where the probe touches with the reference circumferential surface on the X-axis and is then moved along the Y-axis so as to position the axis of the tool spindle at the median between two points where the probe touches with the reference circumferential surface on the Y-axis.

13 Claims, 12 Drawing Figures

| MEMORY ADDRESS | M-FUNCTION | X | Y | Z | + | − | C1 | C2 | CLA | FIN | XA | YA | ZA |
|---|---|---|---|---|---|---|---|---|---|---|---|---|---|
| 10 | M41-0 |   |   |   |   |   |   |   | 1 |   |   |   |   |
| 11 | 1 | 1 |   |   | 1 |   |   |   |   |   |   |   |   |
| 12 | 2 | 1 |   |   |   | 1 | 1 |   |   |   |   |   |   |
| 13 | 3 | 1 |   |   | 1 |   | 1 | 1 |   |   |   |   |   |
| 14 | 4 |   | 1 |   | 1 |   |   |   |   |   |   |   |   |
| 15 | 5 |   | 1 |   |   | 1 | 1 |   |   |   |   |   |   |
| 16 | 6 |   | 1 |   | 1 |   | 1 |   |   |   |   |   |   |
| 17 | 7 |   |   |   |   |   |   |   | 1 | 1 |   |   |   |
| 20 | M42-0 |   |   |   |   |   |   |   |   |   |   |   |   |
| 21 | 1 | 1 |   |   |   |   |   |   |   |   | 1 |   |   |
| 22 | 2 |   | 1 |   |   |   |   |   |   |   |   | 1 |   |
| 23 | 3 |   |   |   |   |   |   |   | 1 |   |   |   |   |
| 24 | 4 |   |   |   |   |   |   |   |   |   |   |   |   |
| 25 | 5 |   |   |   |   |   |   |   |   |   |   |   |   |
| 26 | 6 |   |   |   |   |   |   |   |   |   |   |   |   |
| 27 | 7 |   |   |   |   |   |   |   |   |   |   |   |   |
| 30 | M43-0 |   |   |   |   |   |   |   |   |   |   |   |   |
| 31 | 1 |   |   |   |   |   |   |   |   |   |   |   |   |

AUTOMATIC CENTERING CONTROLLER FOR A MACHINE TOOL

BACKGROUND OF THE INVENTION

1. Field of the Invention

The present invention relates to an automatic centering controller for aligning the axis of a tool spindle of, preferably, a numerically controlled machine tool with the axis of a reference circumferential surface of an article mounted on the machine tool.

2. Description of the Prior Art

In performing a boring operation on a prior numerically controlled machine tool, a tool spindle of the machine tool must be positioned precisely in axial alignment with the axis of a preliminary bore to be machined or of a reference bore in accordance with a numerical control program. Such positioning of the tool spindle, however, invites a deviation of the axis of the tool spindle from the axis of the preliminary or reference bore due to errors which are unavoidably involved in machining the preliminary bore in a preceding step and in setting up a workpiece or a workpiece pallet on the machine tool, and precise alignment of the tool spindle with the preliminary or reference bore is, therefore, hardly attained. For this reason, prior to a boring machining, an operator has to discontinue the tape mode operation of the machine tool, then manually detect the center of a preliminary or reference bore and return the machine tool to the tape mode operation. Such operator's manual centering operation involves setting-up a dial indicator on the tool spindle, then rotating the same at a slow speed with a probe of the indicator tracing an internal surface of the bore, and centering the tool spindle by rotating a manually operated pulse generator until the swing of a pointer of the dial indicator disappears. Such centering operation is not only inefficient as taking a long time to perform, but cannot also be easily performed by unexperienced and unskilled operators.

In addition, the execution of the manual centering operation makes it impossible to return the tool spindle to a centering-start point where the tool spindle was before centering. This results in the unfortunate fact that feed errors that may have occurred in preceding operations of the machine tool cannot be detected even when a return of the tool spindle to a machine origin is executed in the tape mode for the purpose of detecting such feed errors.

SUMMARY OF THE INVENTION

Accordingly, it is a primary object of the present invention to provide an automatic centering controller capable of controlling a machine tool so as to fully automatically and precisely align the axis of a tool spindle with the axis of any of reference circumferential surfaces whose diameters may be unknown or, although known, may be varied.

Another object of the present invention is to provide an automatic centering controller of the character set forth above which is able to switch a numerical controller for a machine tool from a tape mode to a manual mode in response to a centering instruction supplied from the numerical controller, cooperate therewith for the execution of a centering operation and enable the numerical controller to operate again in the tape mode upon completion of the centering operation so that a certain machining operation and a next machining operation can be automatically and successively performed through the centering operation.

A further object of the present invention is to provide an automatic centering controller of the character set forth above which is capable of returning the axis of a tool spindle from a centering-end point onto a centering-start point.

Briefly, according to the present invention, there is provided an automatic centering controller for a machine tool having a tool spindle rotatably carried thereon, servomotors for effecting movement of the tool spindle relative to a workpiece mounted on the machine tool along orthogonal first and second axes, and a drive control device connected to the servomotors for selectively controlling operations of the servomotors in response to axis designation signals and feed pulses applied thereto. The centering controller comprises a touch sensing device, which is adapted to be received in the tool spindle, with a probe thereof being in concentric relation with the axis of the tool spindle. The sensing device is also adapted to output a touch signal to a pulse control circuit when the probe in the tool spindle is brought into touch with a reference circumferential surface which is formed in either the workpiece or a jig supporting the same on the machine tool. The centering controller further comprises a pulse generator connected to the drive control device for applying thereto the feed pulses. The pulse control circuit is connected to the drive control device and the pulse generator and, when instructed to operate, applies the axis designation signals to the drive control device. The control circuit in operation responds to the touch signal output from the touch sensing device for controlling the feed pulses applied to the drive control device so as to effect the relative movement of the tool spindle along each of the first and second axes from one to the other of two points at both of which the probe in the tool spindle touches with the reference circumferential surface. The pulse control circuit further operates to apply the axis designation signals to the drive control device and control the feed pulses applied to the drive control device so as to effect the relative movement of the tool spindle from the other toward the one of the two points along each of the first and second axes. A pulse counting circuit is further provided, which is connected to the pulse control circuit for counting the feed pulses supplied therefrom to the drive control device. In the relative movement of the tool spindle from the other to the one of the two points along each of first and second axes, the pulse counting circuit causes the pulse control circuit to stop applying the feed pulses to the drive control device when receiving the feed pulses of the number corresponding to the half of the feed pulses that are applied to effect the relative movement of the tool spindle from the one to the other of the two points along the corresponding axis.

According to the present invention, the axis of the tool spindle is automatically brought into axial alignment with the axis of the reference circumferential surface. Thus, even in the case where a plurality of machine tools are used to finish a workpiece, the high accuracies of finished surfaces relative to the reference circumferential surface can be ensured. In particular, compensation can be made for errors which are unavoidably involved in setting up and positioning the workpiece on the jig on one or more machine tools, and even if the machine tools have respective characteristics of accuracy in feed control, any undesirable effect caused by the difference between such characteristics can be eliminated, so that highly precise machinings can advantageously be achieved.

BRIEF DESCRIPTION OF THE DRAWINGS

Various other objects, features and attendant advantages of the present invention will readily be appreciated as the same becomes better understood by reference to the following detailed description of a preferred embodiment when considered in connection with the accompanying drawings, wherein like reference numerals designate like or corresponding parts throughout the several views, and in which.

DETAILED DESCRIPTION OF A PREFERRED EMBODIMENT

Figure 1:
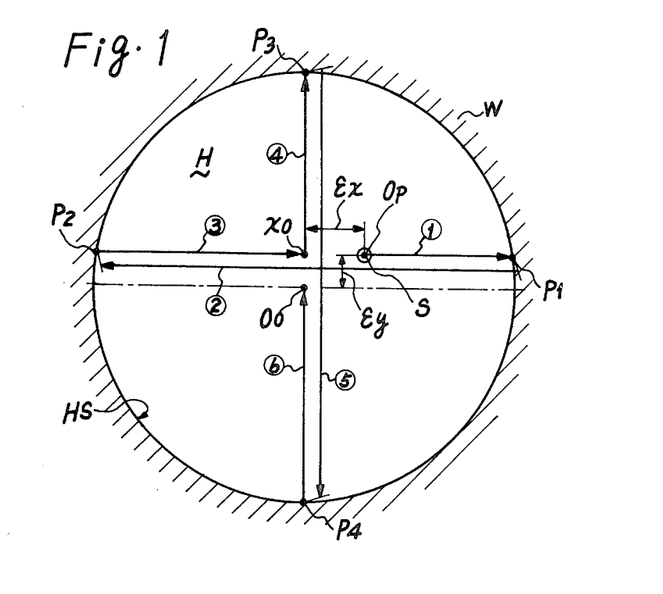
FIG. 1 is an explanatory view illustrating the operational principle of a tool spindle controlled by a centering controller according to the present invention.
Figure 2:
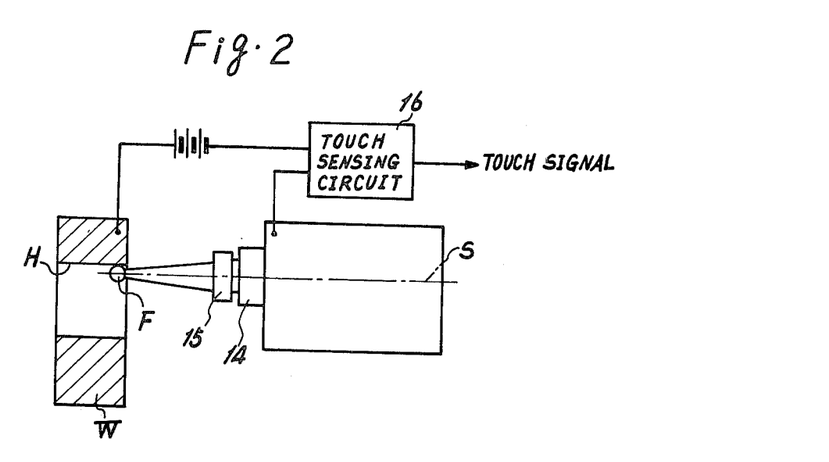
FIG. 2 is an explanatory view illustrating a way to detect touch of a probe with a reference bore.

Referring now to the drawings, in FIG. 1 illustrating the movement of a tool spindle controlled by a centering controller according to the present invention, it is now assumed that the axis or center S of the tool spindle is in axial alignment with a centering-start point Op and is in eccentric relation with the axis or center Oo of a reference bore H of a workpiece W. In order to be centered on the center Oo of the reference bore H, the tool spindle center S is travelled in directions +X and −X and is positioned at the median between two points (P1,P2) intersecting with the internal surface HS. The tool spindle center S is then travelled in directions +Y and −Y and is positioned at the median between two points (P3,P4) intersecting with the internal surface HS. As a means of detecting these points P1, P2, P3 and P4, there is used a measuring tool 15, which, as shown in FIG. 2, is inserted into the tool spindle 14, with a probe F thereof being in concentric relation with the tool spindle center S. A touch sensing circuit 16 is further provided, which, when made electrically conductive, detects the touching of the probe F with the internal surface HS of the reference bore H. Feed pulses are applied to one of servomotors, referred to later, so as to move the tool spindle relative to the workpiece W until a touch signal is output from the sensing circuit 16. At the same time, the feed pulses are counted by at least one of X and Y-axis counters, referred to later, and a feed amount of the tool spindle from a certain position to a touch position is thus detected. A coordinate value of each of the points P1, P2, P3 and P4 can be detected in this manner. In an automatic centering operation, feed pulses are outputted to move the tool spindle center S from the point P1 to the point P2 and feed pulses are outputted to move the tool spindle center S from the point P3 to the point P4. These pulses are selectively counted by a diameter counter, so that there can be detected a distance between the two points P1 and P2 which intersect with the reference bore H on the X-axis and a distance between the two points P3 and P4 which intersect with the reference bore H on the Y-axis. For the purpose of detecting deviation amounts of the reference bore center Oo from the centering-start point Op, the above-noted X and Y-axis counters are provided, each of which adds feed pulses output for feed along the corresponding axis in a positive-going (+) direction and subtracts feed pulses output for feed along the corresponding axis in a negative-going (−) direction. The deviation amounts are stored respectively in the X and Y-axis counters for use in returning the tool spindle center S from the point Oo, that is a centering-end point to the centering-start point Op after a boring operation following the centering operation.

Figure 3:
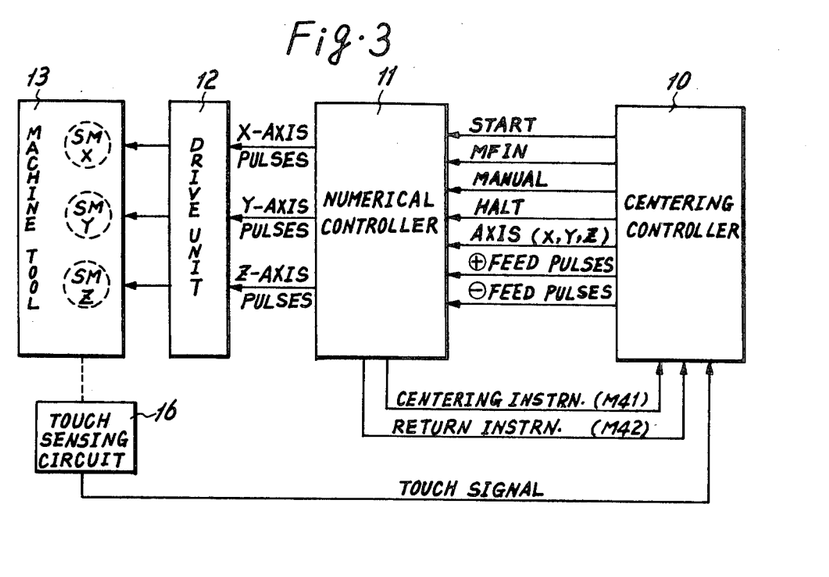
FIG. 3 is a system block diagram illustrative of the connection between the centering controller and a numerical controller.

FIG. 3 is a block diagram of a numerical control system with a centering controller 10 according to the present invention. A reference numeral 11 denotes a conventional numerical controller, 12 denotes a drive unit and 13 denotes a machine tool, which is provided with the touch sensing circuit 16. The centering controller 10 initiates its operation when given a centering instruction (M41) or a return instruction (M42) output from the numerical controller 11 and operates in the following order. That is, the centering controller 10 first changes the operation of the numerical controller 11 to a manual mode by switching off a tape mode operation and applies a halt instruction to the numerical controller 11. The centering controller 10 then applies axis and direction designation signals to the numerical controller 11 and further outputs thereto feed pulses while it controls relative movements of the tool spindle 14 of the machine tool 13 based on the touch signals so that centering steps (1), (2), (3), (4), (5) and (6) as indicated in FIG. 1 are successively performed. Upon completion of a centering operation, the centering controller 10 operates to output a completion signal MFIN to the numerical controller 11, to return the operation of the controller 11 from the manual mode to the tape mode and to apply a start signal to the numerical controller 11.

Figure 4A:
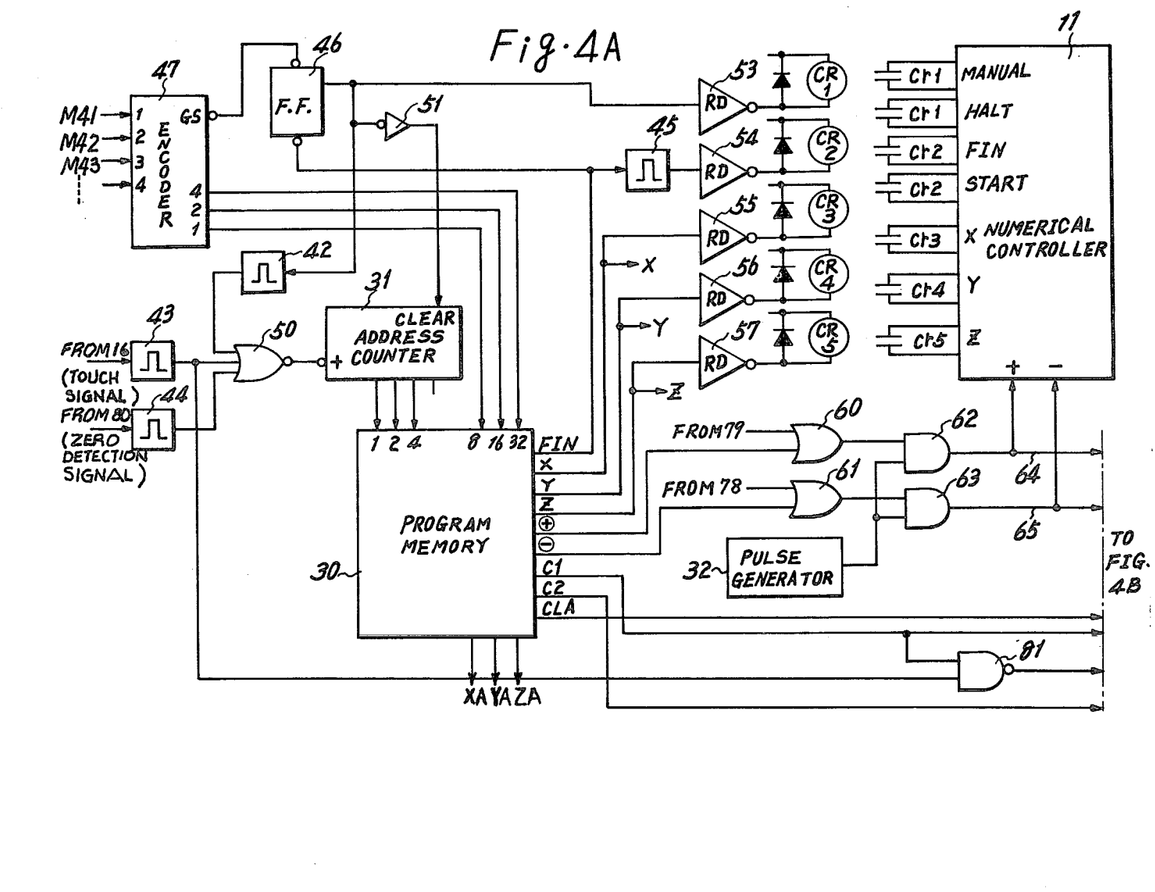
FIG. 4A and 4B are block diagrams illustrating the detailed construction of the centering controller.
Figure 4B:
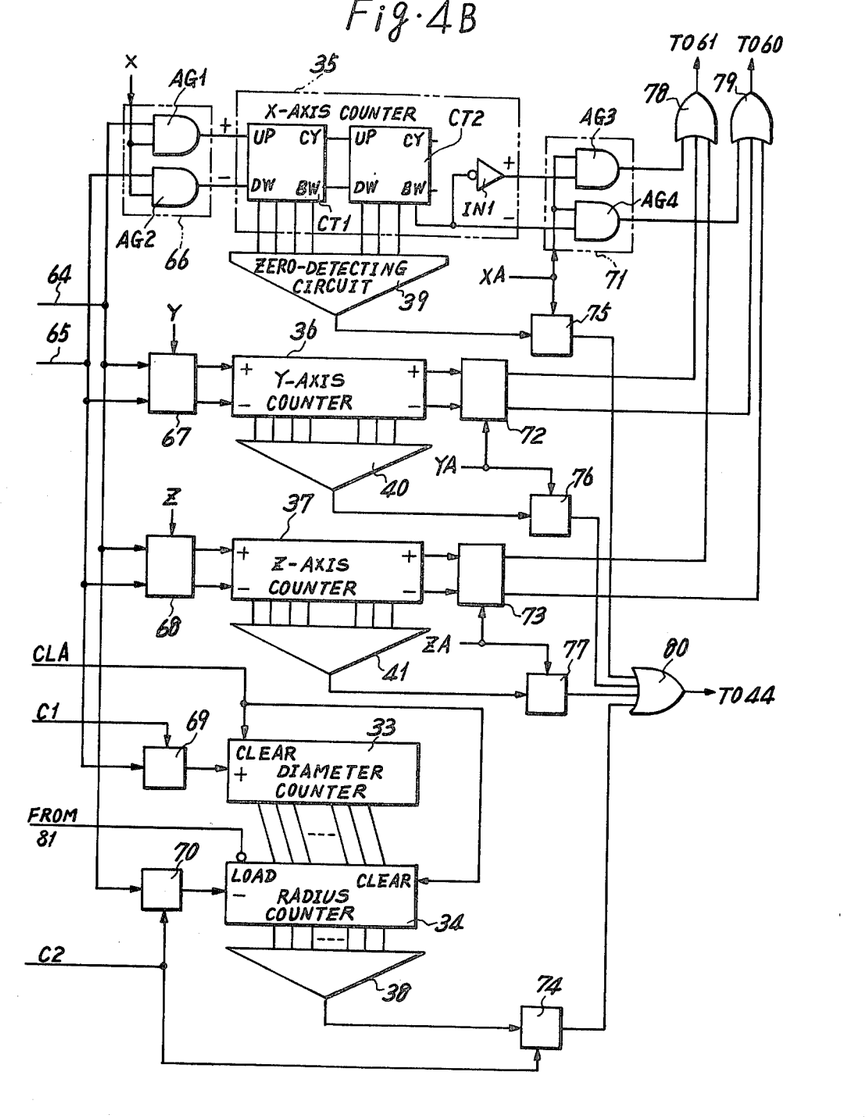
Figure 5:
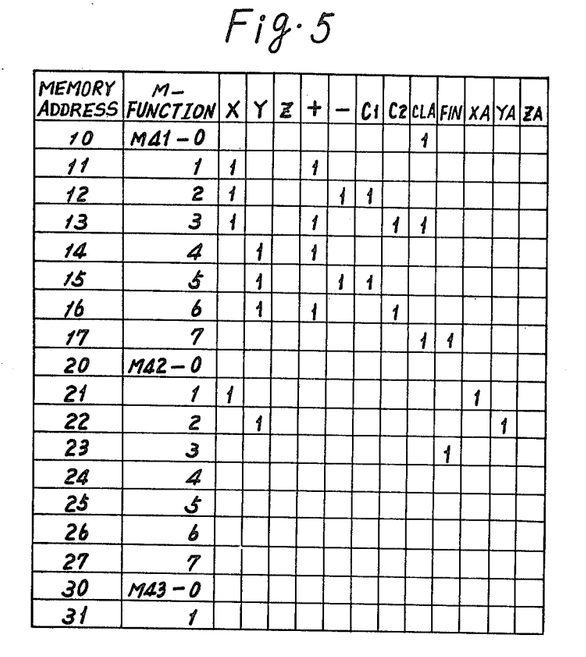
FIG. 5 is a table showing a control signal program stored in a memory for controlling centering and return operations.

FIGS. 4A and 4B illustrate the detailed circuit construction of the centering controller 10, which comprises an erasable and writable read-only memory 30 (hereinafter called "PROM"), an address counter 31 for switching addresses of the PROM 30, a pulse generator 32, a diameter counter 33, a radius counter 34, an X-axis counter 35, a Y-axis counter 36, a Z-axis counter 37, zero-detecting circuits 38–41, one-shot circuits 42–45, a flip-flop 46 and an encoder 47. The centering instruction M41 and the return M42, output from the numerical controller 11, are applied respectively to input terminals of the encoder 47. The encoder 47, when receiving an input at any one of the input terminals, converts the input into signals represented in the form of binary code (a so-called "BC code") so as to output from output terminals thereof the coded signals, which are supplied respectively to more significant bits of address terminals of the PROM 30. Specifically, the encoder 47, when receiving the centering instruction M41, designates memory address (10) as shown in FIG. 5 and, when receiving the return instruction M42, designates memory address (20). The address counter 31 is connected at output terminals thereof respectively to less significant bits of the address terminals of the PROM 30 and, when incremented, switches the memory address from a certain number to the next. An input terminal of the address counter 31 is connected to one-shot circuits 42, 43 and 44 through an OR gate 50 so as to receive therefrom addition pulses respectively at the setting of the flip-flop 46, at the generation of the touch signal, and at the generation of a zero-detection signal. A set input terminal of the flip-flop 46 is connected to a GS terminal of the encoder 47, which sets the flip-flop 46 when receiving a signal at any one of the input terminals thereof. The flip-flop 46 is also connected to receive at a reset input terminal thereof a signal FIN, which is output from the PROM 30 upon completion of each of a centering operation and a return operation. The resetting of the flip-flop 46 causes an inverter 51 to apply a signal therefrom to a clear terminal of the address counter 31, so that the content of the counter 31 is cleared to zero "0".

The PROM 30 has stored therein control signals for use in controlling centering and return operation steps, and FIG. 5 shows the allocation of the control signals to the operation steps. The switching of memory addresses causes the control signals, being stored in a selected address of the PROM 30, to be read out. As shown in FIG. 4A, the PROM 30 is provided with a number of reading-out terminals, which respectively output control signals FIN, X, Y, Z, (+), (−), C1, C2, CLA, XA, YA and ZA. Relay drivers 53–57 are connected to the flip-flop 46, the one-shot circuit 45 and the reading-out terminals of the PROM 30 for energizing magnetic relays CR1–CR5, contacts cr1–cr5 of which are in turn connected to input terminals of the numerical controller 11, respectively. The numerical controller 11, while receiving a signal at a manual mode terminal thereof, is switched form a tape mode operation to a manual mode operation and, while receiving a signal at a halt terminal thereof, is enabled to execute feed controls in response to feed pulses applied to a (+) or (−) terminal thereof. The return of the controller 11 to the tape mode operation is effected at the disappearance of the signal being applied to the manual mode terminal. Further, the numerical controller 11, when receiving a signal at a FIN terminal thereof, is informed of the completion of a sequence of operations executed in accordance with the centering instruction M41 or the return instruction M42 that it output previously and, when receiving a signal at a start terminal thereof, is caused to re-start the tape mode operation. X, Y and Z terminals are provided for respectively selecting feed control axes, and any of servomotors SMX, SMY and SMZ, shown in FIG. 3, associated with a selected one of the control axes is drivingly controlled in response to pulse signals applied to the (+) or (−) terminal. OR gates 60 and 61 and AND gates 62 and 63 serve to send out feed pulses, output from the pulse generator 32, as positive (+) or negative (−) feed pulses selectively onto signal lines 64 and 65. The signal lines 64 and 65 are connected to the X-axis counter 35, the Y-axis counter 26, the Z-axis counter 37, the diameter counter 33 and the radius counter 34 through related gates 66–70, which are responsive to the control signals X, Y, Z, C1 and C2, output from the reading-out terminals of the PROM 30, so as to cause the associated counters to count the (+) and (−) feed pulses. The diameter and radius counters 33, 34 are composed respectively of a binary addition counter and a presettable binary subtraction counter. Output terminals of the diameter counter 33 are connected to input terminals of the radius counter 34 that are lower by one with respect to bit position than the output terminals, respectively, so that the half of a value being stored in the diameter counter 33 is preset in the radius counter 34 when the same receives a signal at a load terminal thereof from a NAND gate 81.

As typically shown in respect to the gate 66, each of the gates 66, 67 and 68 comprises a pair of AND gates AG1 and AG2, which, when receiving the corresponding axis designation signal X, Y or Z, respectively apply the + feed pulses and the − feed pulses to the associated axis counter 35, 36 or 37. Each of the axis counters 34, 36 and 37 is composed of a plurality of binary reversible counter elements CT1 and CT2 and an inverter IN1. The highest bit, not used as an effective digit in counting, of each of the axis counters 35, 36, 37 is connected, directly and indirectly through the inverter IN1, to AND gates AG3 and AG4 provided in each of gating circuits 71, 72 and 73. The highest bit serves as a sign bit, which applies a signal to the AND gate AG3 when a value being stored in the corresponding counter 35, 36 or 37 is positive and to the AND gate AG4 when it is negative. Accordingly, each of the gating circuits 71, 72 and 73, when opened, applies signals (referred to as deviation direction signals later) to the OR gates 60 and 61 through OR gates 78 and 79 so as to control the openings and closings of the AND gates 62 and 63, so that the feed pulses are selectively supplied onto the signal lines 64 and 65. The zero-detecting circuits 38–41 generate zero-detection signals when the contents of the radius counter 34 and the X, Y and Z-axis counters 35–37 are reduced to zero, respectively, and apply the detection signals to the one-shot circuit 44 respectively through relates gates 74–77 and further through an OR gate 80 so as to increment the content of the address counter 31. The gates 75–77 and 74 are responsive to the control signals XA, YA, ZA and C2 applied thereto from the reading-out terminals of the PROM 30 so as to be selectively opened and closed. Each of the X, Y and Z-axis counters 35–37 received an initial reset signal at a clearing terminal, not shown, thereof when electric power is applied thereto, so that the contents of the counters 35–37 are cleared.

CENTERING OPERATION

Figure 6A:
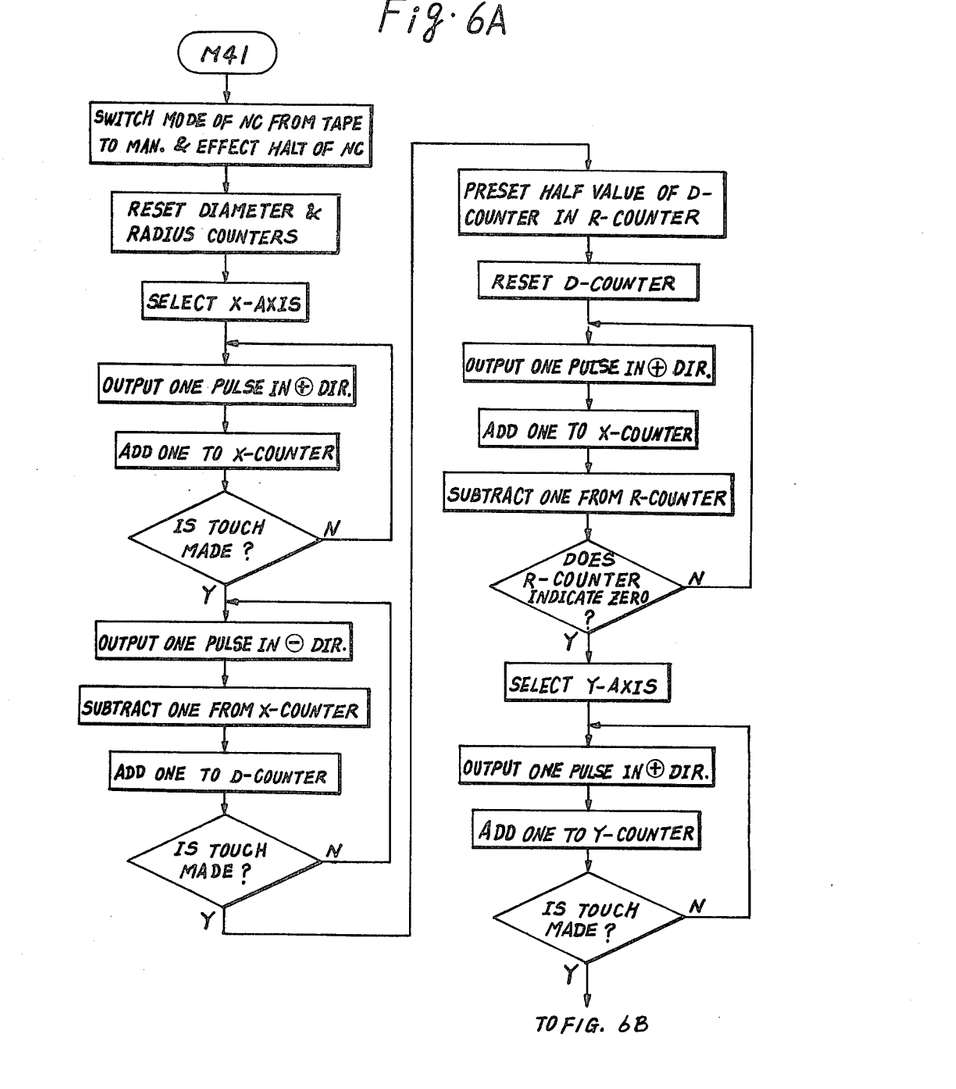
FIGS. 6A and 6B are flow charts showing sequence steps of the centering operation.
Figure 6B:
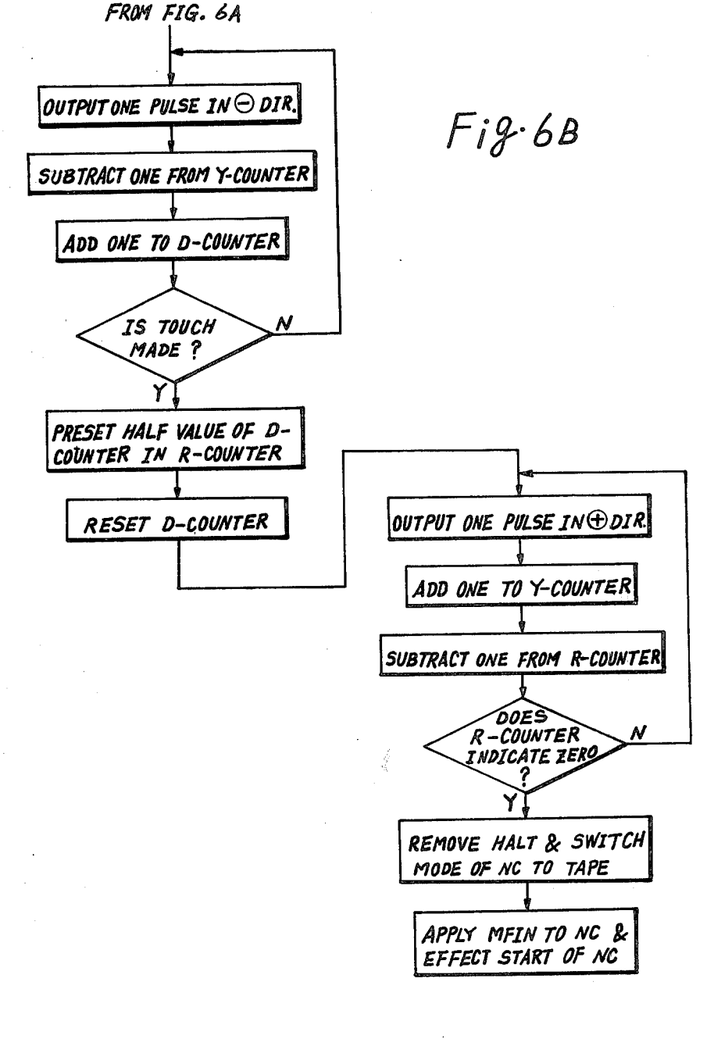

The centering operation of the centering controller 10 as constructed above is performed in order as indicated by a sequence flow chart illustrated in FIGS. 6A and 6B and will be described hereinafter with reference mainly to FIGS. 4A and 4B.

Before the initiation of the centering operation, in accordance with tape information, the measuring tool 14 is inserted into the tool spindle 14, the center S of which is then positioned at a point Op in the vicinity of the true center Oo of the reference bore H. The point Op in the vicinity of the true center Oo is defined as the centering-start point. In order to initiate the centering operation, the centering instruction M41 is subsequently output from the numerical controller 11 and is applied to the encoder 47, which thus outputs from the GS terminal a signal to set the flip-flop 46, so as to thereby energize the relay CR1. Since the contacts cr1 of the relay CR1 are closed, signals are applied respectively to the manual mode terminal and the halt terminal of the numerical controller 11, which is thus switched from the tape-mode operation to the manual mode operation. In the manual mode operation, the numerical controller 11 is enabled to control feed movements in response to pulse signals applied to the (+) and (−) terminals thereof. Since the counter 31 has already been reset, the setting of the flip-flop 46 also effects the designation of memory address (10) of the PROM 30 so as to read out the control signal CLA from the reading-out terminal associated therewith, whereby the diameter counter 33 and the radius counter 34 are cleared.

The setting of the flip-flop 46 further effects applying an addition pulse to the address counter 31 through the one-shot circuit 42 and the OR gaté 50 so as to switch memory address to (11). The control signals X and (+) are read out, and this results in selecting the X-axis through the energization of the relay CR3 as well as in opening the OR gate 60 and the AND gate 62. Feed pulses from the pulse generator 32 are supplied onto the signal line 64 through the AND gate 62, whereby the tool spindle 14 is moved along the X-axis in the (+) direction. Since control signal X is also supplied to the gate 66, the same is opened to transmit the feed pulses from the signal line 64 to the X-axis counter 35 for addition therein. When the probe F of the measuring tool 15, being inserted into the tool spindle 14, reaches the point P1 where it touches with the reference bore H, the touch sensing circuit 16 outputs a touch signal, thus incrementing the content of the address counter 31 for designation of memory address (12), from which the control signals X, (−) and C1 are read out. The application of the control signal (−) to the OR gate 61 causes the AND gate 63 to be opened, through which the feed pulses are supplied onto the signal line 65 so as to move the tool spindle 14 along the X-axis in the (−) direction. In response to the control signal C1, the gate 69 is opened to apply the feed pulses to the diameter counter 33 for addition therein. As the gate 66 is still kept open, the X-axis counter 35 receives the feed pulses so as to subtract the same from a previously counted value being contained therein.

When the arrival of the probe F at the point P2 effects the re-issuance of the touch signal, the NAND gate 81, having already received the control signal C1, is opened to apply a logically low load signal to the load terminal of the radius counter 34, which thus presets therein the half of a counted value being stored in the diameter counter 33. The second issuance of the touch signal also results in incrementing the content of the counter 31 so as to designate memory address (13) to the PROM 30, which thus reads out the control signals X, (+), C2 and CLA. The gates 70 and 74 are opened in response to the control signal C2, and the OR gate 60 and the AND gate 62 are opened in response to the control signal (+) so as to supply the feed pulses onto the signal line 64. Consequently, while the tool spindle 14 is moved along the X-axis in the (+) direction, the radius counter 34 subtracts the feed pulses from the preset value therein and the X-axis counter 35 executes an addition operation. With the content of the radius counter 34 reduced to zero, the zero-detecting circuit 38 outputs the zero-detection signal, which is applied to the one-shot circuit 44 through the gate 74 and the OR gate 80, and the content of the address counter 31 is incremented to designate memory address (14). It is to be noted herein that, when the content of the radius counter 34 is reduced to zero, the tool spindle center S is brought into axial alignment with the median Xo between the points P1 and P2 in FIG. 1, and that, at this time, the content of the X-axis counter 35 coincides with a deviation amount $-\epsilon x$ of the median Xo from the point Op and is maintained stored for use in the return operation which will be performed in response to the return instruction M42.

The designation of memory address (14) causes the control signal Y to be read out for selection of the Y-axis and further causes the control signal (+) to be read out for openings of the OR gate 60 and the AND gate 62, through which the feed pulses are supplied onto the signal line 64, whereby the tool spindle 14 is moved along the Y-axis in the (+) direction. Since the gate 67 is opened in response to the control signal Y, the Y-axis counter 36 adds the feed pulses. When the tool spindle 14 reaches the point P3, the touch signal is issued to increment the content of the address counter 31, and memory address (15) is designated to read out the control signals Y, (−) and C1. Thus, the tool spindle 14 is moved along the Y-axis in the (−) direction, and the diameter counter 33 adds the feed pulses since the gate 69 is opened in response to the control signal C1. The subsequent arrival of the tool spindle 14 at the point P4 effects the issuance of the touch signal, which is applied to the NAND gate 81. Having already received the control signal C1, the NAND gate 81 is opened and applies the load signal to the radius counter 34, which thus presets therein the half of a counted value being stored in the diameter counter 33. Thereafter, the address counter 31 is incremented to designate memory address (16) so as to read out therefrom the control signals Y, (+) and C2. The tool spindle 14 is moved along the Y-axis in the (+) direction, while the gates 70 and 74 are kept open so as to cause the radius counter 34 to subtract the feed pulses from the preset value being stored therein. With the content of the counter 34 reduced to zero, the zero-detection signal is issued and applied through the gate 74 and the OR gate 80 to the one-shot circuit 44, which thus causes the address counter 31 to increment its content and designate memory address (17). This results in discontinuing the travel of the tool spindle 14, the center S of which is therefore centered on the reference bore center Oo, which is defined as a centering-end point. At this time, the content of the Y-axis counter 36 coincides with a deviation amount $-\epsilon y$ of the point Oo from the point Op in the Y-axis direction and is maintained stored for use in the return operation, as referred to later, executed in response to the return instruction M42.

The designation of the memory address (17) causes the control signals CLA and FIN to be read-out, and the diameter counter 33 and flip-flop 46 are respectively cleared and reset in response to the signals CLA and FIN. The resetting of the flip-flop 46 effects clearing the content of the address counter 31 and further effects deenergizing the relay CR1 so as to shut off the signals which were being applied to the manual mode terminal and the halt terminal of the numerical controller 11. Accordingly, the operation of the numerical controller 11 is switched from the manual mode to the tape mode. The read-out control signal FIN is also applied to the one-shot circuit 45 with the result of energizing the relay CR2, and a centering completion signal is applied to the FIN terminal of the numerical controller 11, which thus stops the application of the centering instruction M41 to the encoder 47. The one-shot circuit 45 causes the relay CR2 to be deenergized after the expiration of a predetermined period period of time, and at the moment that the contact cr2 connected to the start terminal is opened, the numerical controller 11 is started to operate again in the tape mode. Thereafter, in accordance with tape information, a tool exchange operation is carried out to exchange the measuring tool 15 with a boring tool, not shown, and a boring operation is then initiated.

Figure 8:
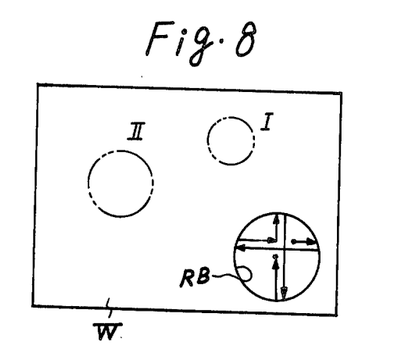
FIG. 8 is an elevational view of a workpiece on which bores are to be machined at portions distant from a reference bore.
Figure 9:
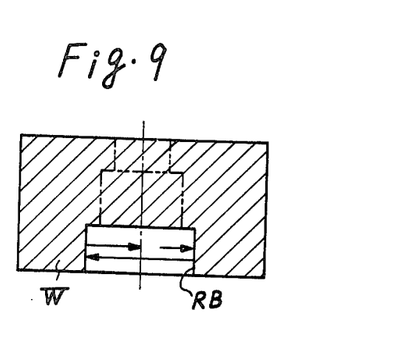
FIG. 9 is a cross-sectional view of another workpiece on which a bore is to be machined in axial alignment with a reference bore.

The foregoing centering operation is executed in the case where compensation is necessary for errors which are involved in setting up a workpiece or a workpiece pallet on the machine tool or in the case where a bore must be machined in a workpiece in concentric relation with a reference bore which has been machined in the same workpiece in a preceding step. In the former case, a reference bore RB constituting a machining reference is provided on the workpiece or the workpiece pallet W as shown in FIG. 8, and a machining operation is carried out after a centering operation with regard to the reference bore RB. This results in compensating for any setting error of the workpiece or the pallet W relative to the machine tool, so that machining accuracy can be enhanced with respect to bore-to-bore distance and concentricity. In the latter case, on the other hand, a bore machining is carried out after the tool spindle 14 is centered on the axis of the reference bore RB which has been machined in the preceding step, as shown in FIG. 9. Thus, a bore machining of high concentricity can be realized even if different machine tools are used in the respective machining steps.

RETURN OPERATION

Figure 7:
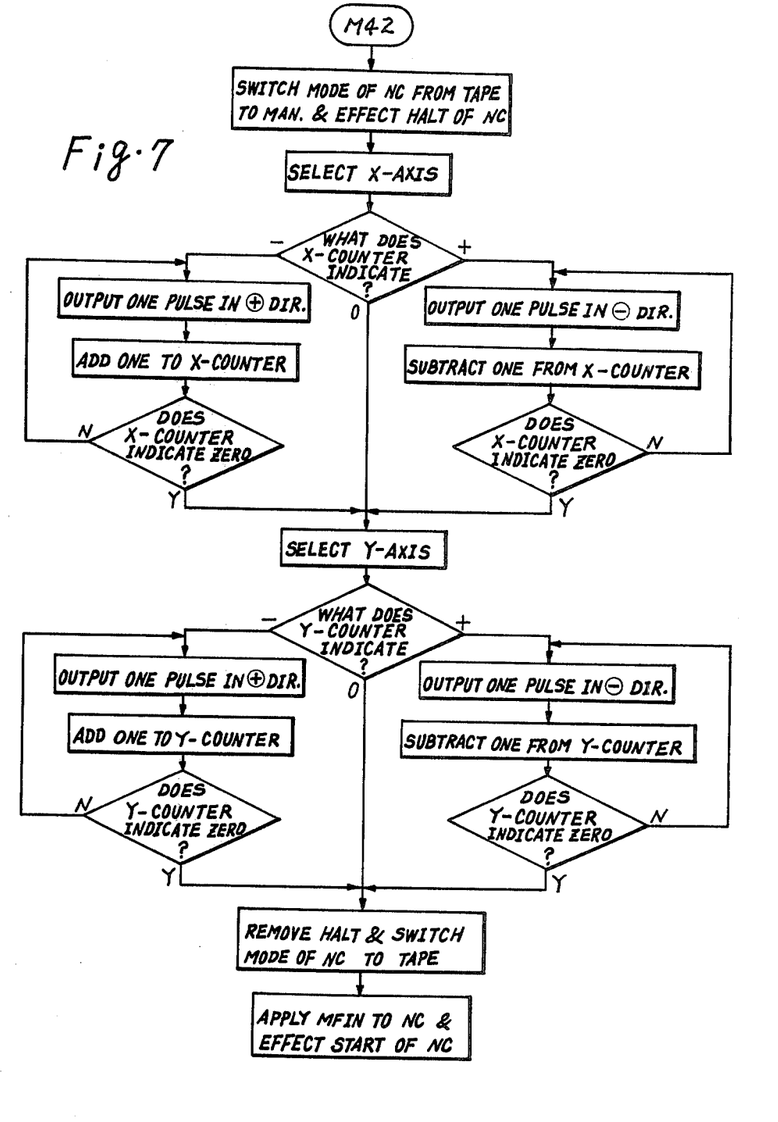
FIG. 7 is a flow chart showing sequence steps of the return operation.

After the boring operation, it is necessary to return the center S of the tool spindle 14 onto the centering-start point Op for the purpose of controlling successive numerical control operations as programmed in tape information. To this end, the return operation is performed in order as indicated by a sequence flow chart illustrated in FIG. 7. The return operation will be described hereinunder with reference chiefly to FIGS. 4A and 4B.

Upon completion of the foregoing centering operation, the deviation amounts $-\epsilon x$ and $-\epsilon y$ between the points Op and Oo occupied by the tool spindle center S before and after the centering operation are being kept stored respectively in the X and Y-axis counters 35 and 36. In this situation, when the return instruction M42 is output form the numerical controller 11 to one of the input terminals of the encoder 47, the flip-flop 46 is set, and through the energization of the relay CR1, the numerical controller 11 is switched to the manual mode operation. Although memory address (20) of the PROM 30 is designated at the same time, no control signal is read out therefrom. Subsequently, the one-shot circuit 42 receiving the set signal from the flip-flop 46 outputs a signal to increment the content of the address counter 31, which thus designates memory address (21) so as to read out therefrom the control signals X and XA. This effects the selection of the X-axis and the openings of the gates 71 and 75. Because the Value $-\epsilon x$ being stored in the X-axis counter 35 is negative, the OR gates 79 and 60 and the AND gate 62 are opened in order in response to a first deviation direction signal output from the gate 71, and feed pulses are supplied onto the signal line 64, whereby the tool spindle 14 is moved along the X-axis in the (+) direction. It is noted herein that, if a second deviation direction signal is applied to the OR gate 78, the OR gate 61 and the AND gate 63 are opened so as to move the tool spindle 14 along the X-axis in the (−) direction. Since the gate 66 has been opened by receiving the control signal X, the feed pulses are also supplied to the X-axis counter 35 so as to be added to the counted value $-\epsilon x$. As a result, when the counter 35 receives the feed pulses of the number corresponding to the value $\epsilon x$, the zero-detection signal is output from the zero-detecting circuit 39 and is applied through the gate 75 and the OR gate 80 to the one-shot circuit 44. The address counter 31 is caused to increment its content so as to designate memory address (22), from which the control signals Y and YA are therefore read out.

The reading-out of the control signals Y and YA effects the selection of the Y-axis and the openings of the gates 67, 72 and 76. Becuase the value $-\epsilon y$ being stored in the Y-axis counter 36 is negative, the gate 72 applied the first deviation direction signal to the OR gate 79, and the OR gates 79 and 60 and the AND gate 62 are opened to supply feed pulses onto the signal line 64. Consequently, the tool spindle 14 is moved along the Y-axis counter 36 so as to be added to the value $-\epsilon y$. When the content of the Y-axis counter 36 is increased to zero, the zero-detection signal is output from the zero-detecting circuit 40 and is applied to the one-shot circuit 44 through the gate 76 and the OR gate 80. The address counter 31 is caused to increment its content so as to designate memory address (23), from which the control signal FIN is read out, thus indicating the completion of the return operation. The flip-flop 46 is reset by the control signal FIN so as to clear the content of the address counter 31 and to deenergize the relay CR1, and the energization of the relay CR2 is also effected by the reading-out of the control signal FIN. The numerical controller 11 is switched from the manual mode operation to the tape mode operation and is instructed to operate, so that the operation of the controller 11 according to tape information is re-started.

Although the centering operation in an X-Y plane is described in the foregoing embodiment, it should be noted that certain kinds of machine tools may perform the centering operation in a plane including the Z-axis. The centering operation is, however, possible even in such a case by defining the centering instruction and the return instruction in respective coded alpha numerals which specify the centering plane and by storing in the PROM 30 a control signal program suitable for the centering plane.

Figure 10:
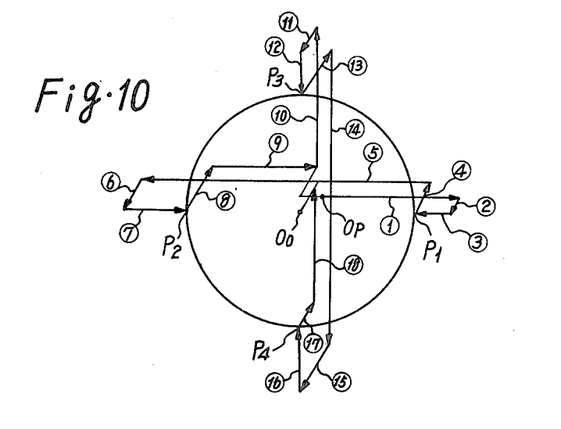
FIG. 10 is a cycle chart showing operational steps in centering the tool spindle on the axis of a reference shaft.

Further, in addition to centering the tool spindle on the center of the reference bore, it is also possible to center the tool spindle 14 on the center of a reference circumferential surface of a reference shaft. In this case, the centering can be automatically performed in the same manner as the foregoing embodiment by storing in the PROM 30 a control signal program that is composed of operational sequence steps (1) to (18) as indicated in FIG. 10.

What is claimed as new and desired to be secured by Letters Patent of the United States is:

1. In a combination of a machine tool having a tool spindle rotatably carried therein, and a plurality of servomotors for effecting movement of said tool spindle relative to an article mounted on said machine tool along orthogonal first and second axes, the improvement comprising:

drive control means connected to said servomotors for selectively controlling operations of said servomotors in accordance with feed pulses and axis designation signals applied thereto; and an automatic centering controller comprising,
  touch sensing means capable of being received in said tool spindle, with a probe thereof being in concentric relation with the axis of said tool spindle and capable of outputting a touch signal each time said probe in said tool spindle is brought into contact with a reference circumferential surface provided on said article,
  a pulse generator connected to said drive control means for applying thereto said feed pulses so as to drive said servomotors,
  first pulse control means connected to said pulse generator and said drive control means and responsive to said touch signal for applying said axis designation signals to said drive control means and controlling said feed pulses applied to said drive control means so as to effect the relative movement of said tool spindle along each of said first and second axes from one to the other of two points at both of which said probe in said tool spindle touches said reference circumferential surface,
  second pulse control means connected to said pulse generator and said drive control means for applying said axis designation signals to said drive control means and controlling said feed pulses applied to said drive control means so as to effect said relative movement of said tool spindle from said other toward said one of said two points along each of said first and second axes, and
  pulse counting means connected to said first and second pulse control means for counting said feed pulses applied from said first and second pulse control means to said drive control means so as to cause said second pulse control means to stop applying said feed pulses to said drive control means when receiving from said second pulse control means said feed pulses of a number of corresponding to half of said feed pulses applied from said first pulse control means.

2. In the combination as set forth in claim 1, wherein: said pulse counting means is responsive to a first count signal supplied thereto when said touch sensing means outputs said touch signal at said one point along each of said first and second axes, for counting said feed pulses applied from said first pulse control means and also to a second count signal supplied thereto when said touch sensing means outputs said touch signal at said other point along each of said first and second axes, for counting said feed pulses applied from said second pulse control means and is adapted to output a zero-detection signal so as to cause said second pulse control means to stop applying said feed pulses when receiving from said second pulse control means said feed pulses of a number corresponding to half of said feed pulses applied from said first pulse control means.

3. In the combination as set forth in claim 2, the improvement further comprising:
  said first and second pulse control means comprising gate means connected to said pulse generator, said drive control means and said pulse counting means and responsive to direction designation signals for applying said feed pulses to said drive control means and said pulse counting means.

4. In the combination as set forth in claim 3, the improvement further comprising:
  control signal generating means connected to said touch sensing means, said pulse counting means, said drive control means and said gate means and responsive to a centering instructioon, said touch signal and said zero-detection signal for generating said axis designation signals, said direction designation signal and said first and second count signals in a predetermined order so that said relative movement of said tool spindle is first effected along said first axis so as to position the axis of said tool spindle at the median between said two points along said first axis and then, is effected along said second axis so as to position the axis of said tool spindle at the median between said two points along said second axis.

5. In the combination as set forth in claim 4, wherein: said drive control means comprises a numerical controller capable of outputting said centering instruction to said control signal generating means when operated in a tape mode and of controlling said servomotors in response to said axis designation signals and said feed pulses, applied respectively from said control signal generating means and said gate means, when operated in a manual mode; and
  said control signal generating means is responsive to said centering instruction for switching the operation of said numerical controller from said tape mode to said manual mode and is further responsive to said zero-detection signal applied thereto when the axis of said tool spindle is positioned at said median between said two points along said second axis, for generating a completion signal so as to enable said numerical controller to operate again in said tape mode.

6. In the combination as set forth in claim 5 or 4, wherein said control signal generating means is operable to generate a preset signal in response to said touch signal whenever said relative movement of said tool spindle is effected from said one to said other of said two points along each of said first and second axes; and wherein said pulse counting means comprises:
  an addition counter connected to said control signal generating means and said gate means and responsive to said first count signal for adding said feed pulses applied thereto while said relative movement of said tool spindle is effected from said one to said other of said two points along each of said first and second axes;
  a presettable subtraction counter connected to said control signal generating means, said gate means and said addition counter and responsive to said preset signal for presetting therein half of a value being stored in said addition counter, said subtraction counter being also responsive to said second counter signal for subtracting from the preset value said feed pulses applied thereto while said relative movement of said tool spindle is effected from said other toward said one of said two points along each of said first and second axes; and
  a zero-detecting circuit connected to said subtraction counter and said control signal generating means for outputting said zero-detection signal to said control signal generating means when said preset value being stored in said subtraction counter is reduced to zero.

7. In the combination as set forth in claim 6, wherein said control signal generating means comprises:
   memory means for storing said axis designation signals, said direction designation signals, said first and second count signals, said preset signal and said completion signal; and
   read-out control means responsive to said centering instruction, said touch signal and said zero-detection signal for selectively designating memory addresses of said memory means so as to control said memory means to selectively read out all of said signals being stored therein.

8. In the combination as set forth in claim 1, the improvement further comprising:
   deviation detecting means connected to said first and second pulse control means for selectively adding and subtracting said feed pulses applied thereto in response to said axis designation signals so as to detect and store deviation distances along said first and second axes between a centering-start point and a centering-end point, where the axis of said tool spindle is positioned respectively before and after a centering operation, and deviation direction signals indicating directions of the deviations along said first and second axes of said centering-end point from said centering-start point; and
   third pulse control means connected to said pulse generator, said drive control means and said deviation detecting means for controlling said feed pulses applied to said drive control means based on said deviation distances and said deviation direction signals, being stored in said deviation detecting means, so as to return the axis of said tool spindle from said centering-end point onto said centering-start point.

9. In the combination as set forth in claim 8, wherein:
   said pulse counting means is responsive to a first count signal supplied thereto when said touch sensing means outputs said touch signal at said one point along each of said first and second axes, for counting said feed pulses applied from said first pulse control means and also to a second count signal supplied thereto when said touch sensing means outputs said touch signal at said other point along each of said first and second axes, for counting said feed pulses applied from said second pulse control means and is adapted to output a first zero-detection signal so as to cause said second pulse control means to stop applying said feed pulses when receiving from said second pulse control means said feed pulses of the number corresponding to half of said feed pulses applied from said first pulse control means; and
   said deviation detecting means is connected also to said third pulse control means for subtracting said feed pulses, applied therefrom, selectively from said deviation distances, being stored in said deviation detecting means in correspondence respectively to said first and second axes, and is adapted to generate second and third zero-detection signals respectively when said deviation distances become zero, so as to cause said third pulse control means to stop applying said feed pulse to said drive control means.

10. In the combination as set forth in claim 9, wherein said first, second and third pulse control means comprises:
   gate means connected to said pulse generator, said drive control means, said pulse counting means and said deviation detecting means and responsive selectively to said direction designation signals and said deviation direction signals for applying said feed pulses from said pulse generator selectively as positive feed pulses and negative feed pulses to said drive control means, said pulse counting means and said deviation detecting means; and
   control signal generating means connected to said touch sensing means, said pulse counting means, said deviation detecting means, said drive control means and said gate means and responsive to a centering instruction, said touch signal and said first zero-detection signal for generating said axis designation signals, said direction designation signals and said first and second count signals in a predetermined order so that said relative movement of said tool spindle is effected from said centering-start point first along said first axis and then along said second axis so as to position the axis of said tool spindle at said centering-end point.

11. In the combination as set forth in claim 10, wherein:
   said control signal generating means is adapted to generate gate enabling signals so as to enable said gate means to operate in response to said deviation direction signals output from said deviation detecting means and is responsive also to a return instruction and said second and third zero-detection signals for generating said axis designation signals and said gate enabling signals so that said relative movement of said tool spindle is effected from said centering-end point so as to position the axis of said tool spindle at said centering-start point.

12. In the combination as set forth in claim 11, wherein:
   said drive control means is a numerical controller capable of selectively outputting said centering instruction and said return instruction when operated in a tape mode and of controlling said servomotors in response to said axis designation signals and said feed pulses, applied respectively from said control signal generating means and said gate means, when operated in a manual mode; and
   said control signal generating means is responsive selectively to said centering instruction and said return instruction for switching the operation of said numerical controller from said tape mode to said manual mode and is further responsive selectively to said first zero-detection signal applied thereto when the axis of said tool spindle is positioned at said centering-end point and to at least one of said second and third zero-detection signals applied thereto when the axis of said tool spindle is returned onto said centering-start point, for generating a completion signal so as to enable said numerical controller to operate again in said tape mode.

13. In the combination as set forth in claim 10, 11 or 12, wherein said deviation detecting means comprises:
   first and second reversible counters each connected to said control signal generating means and said gate means and each responsive to corresponding one of said axis designation signals for adding said positive feed pulses and subtracting said negative feed pulses, each of said first and second reversible counters being adapted to selectively generate said deviation direction signals depending respectively upon positive and negative values being selectively stored therein; and zero-detecting circuits connected to said first and second reversible counters for generating said second and third zero-detection signals when the contents of said first and second reversible counters become zero respectively.

* * * * *